United States Patent Office.

HENRY C. HUMPHREY, OF NEW YORK, ASSIGNOR TO FRANZ O. MATTHIESSEN, OF IRVINGTON, AND WILLIAM A. WIECHERS, OF NEW YORK, N. Y.

METHOD OF TREATING MAIZE OR OTHER GRAIN IN THE MANUFACTURE OF BEER, SPIRITS, GLUCOSE, GRAPE-SUGAR, AND OTHER PRODUCTS.

SPECIFICATION forming part of Letters Patent No. 251,887, dated January 3, 1882.

Application filed July 9, 1881. (No specimens.)

*To all whom it may concern:*

Be it known that I, HENRY C. HUMPHREY, of the city and State of New York, have invented an Improved Method of Treating Maize or other Grain in the Manufacture of Beer, Spirits, Glucose, Grape-Sugar, and other Products, of which the following is a specification.

In manufacturing glucose direct from corn it is usual to grind the corn and then convert the starchy matter it contains by treatment with acid. The resulting liquor has a bitter taste and a dark color, which are with difficulty removed by the subsequent refining processes. This taste and color are mostly due to the action of the acid upon the germs and hulls of the grain during the time necessarily occupied in converting the starch, and the prolonged exposure to acid injures the germs and hulls for use as fodder, or for the manufacture of oil, for which purposes they may be advantageously employed after the starchy matter of the corn has been separated.

It is the object of my invention to avoid these disadvantages. I accomplish this result by treating corn which has been suitably prepared by soaking and crushing in the usual manner with an amount of acid sufficient to render the starch soluble, and to form a starch solution of a density of from 10° to 12° Baumé, from which I remove the undissolved material, which consists chiefly of germs and hulls. The starch solution which I thus obtain, and which, for convenience, I call my "preliminary solution," I saccharify by any of the means usually employed.

In carrying out my process the corn, having been soaked until it is properly softened and drained, is crushed in rollers, which break up the starchy portions, but leave the germs and hulls in comparatively large pieces. The crushed corn I mix in a tank provided with a stirrer, with a certain proportion of water, containing about one-half per cent. of sulphuric acid, and maintain the mixture at a temperature of about 212° Fahrenheit, until the starch has been dissolved. The quantity of acidulated water employed is proportioned with reference to producing in this way a starch solution of from 10° to 12° Baumé. In a solution of this density the germs rise to the surface, from which they may be run or skimmed off and dried preparatory to having the oil extracted from them. By my invention, therefore, I free the germs or oil-bearing portion of the grain from the adhering mass by dissolving in an acid solution the starchy and other soluble portions; and then separating the germs from the hulls and adhering undissolved portions by means of a menstruum of such specific gravity that the germs will float upon its surface, while the hulls and other undissolved portions will sink. After the separation of the principal portion of the germs by skimming, or before if it be not desired to separate a portion of the germs in this way, the contents of the tank are discharged upon a sieve, such as is commonly used, by means of which the hulls and germs are separated from the starch solution, which is filtered through the sieve into a receiving-vessel.

It will thus be seen that by my treatment of the entire grain with a suitable quantity of acidulated water there is first formed a preliminary solution of starch, from which, as soon as it is formed, the germs and hulls and other undissolved portions of the grain are immediately removed, in order that the process of conversion may go on and be completed without the injury to the product resulting from prolonged action of the acid upon the germs and hulls.

In proceeding with the saccharification of the starch solution an additional quantity of acid may or may not be employed, or the acid present may be neutralized, and the completion of the conversion may be effected by the use of malt in the usual way.

In the formation of my preliminary solution, or in converting the starch, I may employ any of the organic or inorganic acids heretofore used.

It will of course be understood that I do not limit myself to any particular mode of soaking the corn, or of crushing or separating the germs or hulls from the starch-liquor; nor do I limit myself to a temperature of 212° for forming the preliminary solution, or in the subsequent saccharification, as I may of course employ a lower heat, or a much higher heat, when working under pressure.

It will also be understood that the germs and hulls, or the hulls alone, after the separation of the germs, may be collected for use as fodder by the employment of the usual methods.

I am aware that corn has been treated with hot acidulated water for the purpose of softening it prior to grinding; but by my process the corn is first ground and then treated with acid for the purpose of forming a preliminary solution of the starch, the treatment with acid being continued only for a sufficient period to render the starch soluble and form a starch solution of the required density, in order that the germs, hulls, and other undissolved portions of the corn may be at once removed.

What I claim as my invention, and desire to secure by Letters Patent of the United States, is—

The mode of freeing the germs from corn herein described, which consists in treating crushed corn with hot acidulated water for a sufficient period to render the starch soluble, and to thereby form a suitably dense starch solution, in which the hulls and other undissolved portions of the corn will sink, while the germs float upon the surface, and in then skimming or otherwise removing the germs from the surface of the starch solution.

H. C. HUMPHREY.

Witnesses:
O. H. KRAUSE,
H. E. NIESE.